(12) United States Patent
Mauri

(10) Patent No.: US 10,756,624 B2
(45) Date of Patent: Aug. 25, 2020

(54) HYBRID DC-DC CONVERTER

(71) Applicant: Bel Fuse (MACAO COMMERCIAL OFFSHORE) Limited, Macao (MO)

(72) Inventor: Giorgio Augusto Mauri, Milan (IT)

(73) Assignee: Bel Fuse (MACAO COMMERCIAL OFFSHORE) Limited, Macao (MO)

( * ) Notice: Subject to any disclaimer, the term of this patent is extended or adjusted under 35 U.S.C. 154(b) by 0 days.

(21) Appl. No.: 16/568,933

(22) Filed: Sep. 12, 2019

(65) Prior Publication Data

US 2020/0083805 A1 Mar. 12, 2020

Related U.S. Application Data

(60) Provisional application No. 62/730,173, filed on Sep. 12, 2018.

(51) Int. Cl.
*H02M 3/07* (2006.01)
*H02M 3/158* (2006.01)
*H02M 3/335* (2006.01)
*H02M 1/00* (2006.01)

(52) U.S. Cl.
CPC ........... *H02M 3/07* (2013.01); *H02M 3/1582* (2013.01); *H02M 3/33576* (2013.01); *H02M 2001/007* (2013.01)

(58) Field of Classification Search
CPC ............. H02M 3/07; H02M 2001/007; H02M 3/33576; H02M 3/158; H02M 3/1582
See application file for complete search history.

(56) References Cited

U.S. PATENT DOCUMENTS

| 7,777,459 B2 | 8/2010 | Williams |
| 8,860,396 B2 | 10/2014 | Giuliano |
| 9,548,668 B2 * | 1/2017 | Fu ..................... H02M 3/33569 |
| 2013/0135903 A1 | 5/2013 | Fu et al. |
| 2016/0149501 A1 * | 5/2016 | Dai ....................... H02M 3/337 363/21.02 |
| 2017/0244318 A1 * | 8/2017 | Giuliano ................. H02M 3/07 |

* cited by examiner

Primary Examiner — Jue Zhang
(74) Attorney, Agent, or Firm — BainwoodHuang

(57) ABSTRACT

A DC-DC converter suitable for conversion of high input voltages to regulated low output voltages at very high output currents has a cascade of stages including a buck regulation stage, an unregulated switched capacitor voltage doubler, and an unregulated voltage isolation stage. These three stages are merged in a single switching structure so that each stage optimally performs its respective function while also taking advantage of characteristics and features of neighboring stages.

13 Claims, 7 Drawing Sheets

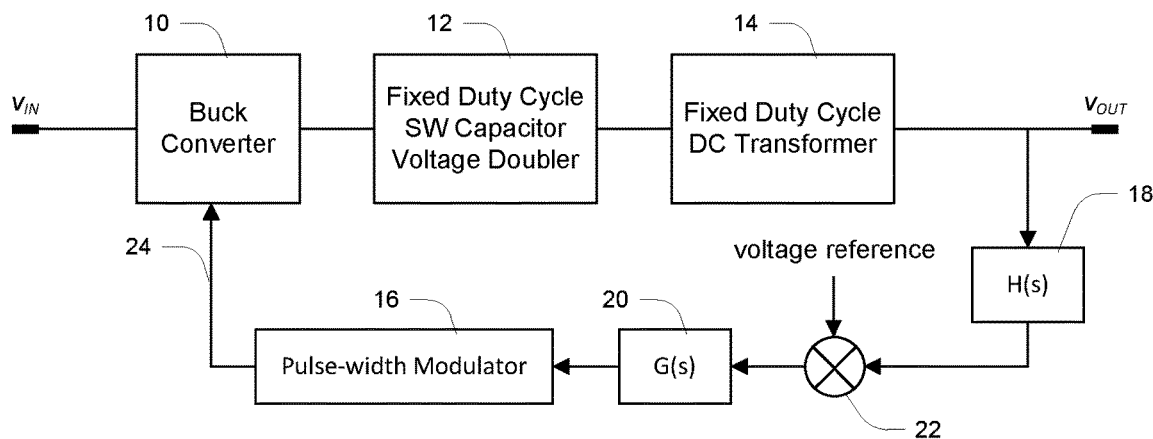
Fig. 1
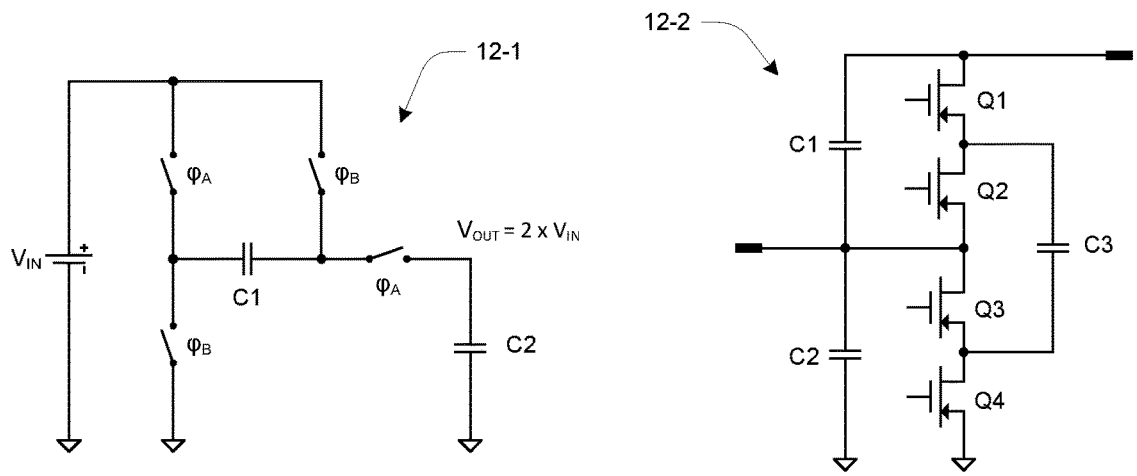
Fig. 2
Fig. 3

HYBRID DC-DC CONVERTER

BACKGROUND

This application relates to the field of DC-DC converters.

SUMMARY

A disclosed DC-DC converter suitable for conversion of high input voltages to regulated low output voltages at very high output currents has a cascade of stages including a buck converter regulation stage, an unregulated switched capacitor voltage doubler, and a voltage isolation stage. These three stages can be merged in a single switching structure so that each stage optimally performs its respective function while also taking advantage of characteristics and features of neighboring stages.

More particularly, a disclosed hybrid DC-DC converter includes cascaded first, second and third stages and regulation feedback circuitry coupled between an output of the DC-DC converter and a control input of the first stage for overall regulation of the DC-DC converter. The first stage is a switched inductance stage generating a first intermediate DC voltage from an input DC voltage. The second stage is an unregulated switched capacitance stage generating a second intermediate DC voltage as a predetermined multiple of the first intermediate DC voltage, and the third stage is an isolation stage providing the output of the DC-DC converter from the second intermediate DC voltage. The first stage operates in response to a pulse width modulation signal at the control input, provided by the regulation feedback circuitry, to generate the first intermediate DC voltage so as to achieve the overall regulation of the DC-DC converter.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 1 is a block diagram of a hybrid DC-DC converter;

FIGS. 2-5 are schematic diagrams of switched-capacitor voltage doublers;

DETAILED DESCRIPTION

Figure 4:
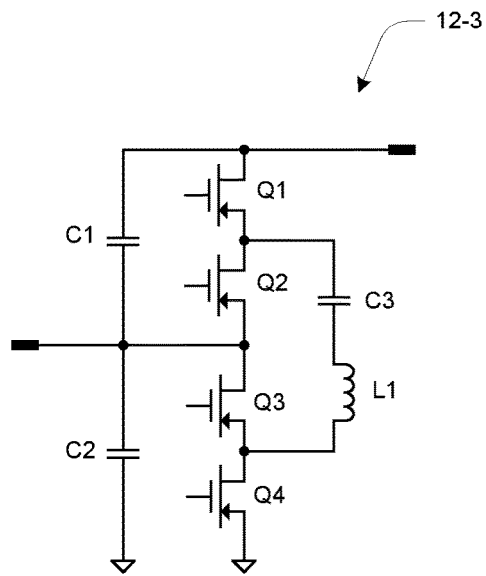

A DC-DC converter suitable for conversion of high input voltages to regulated low output voltages at very high output currents has a cascade of stages including a buck regulation stage, an unregulated switched capacitor voltage doubler, and an unregulated voltage isolation stage. These three stages are merged in a single switching structure so that each stage optimally performs its respective function while also taking advantage of characteristics and features of neighboring stages.

Motivation and Objectives

Processors for desktop computers, workstations and low-end servers require voltage regulators to work with input voltages such as 12 V DC, for example. One widely used DC-DC converter topology for such voltage regulators is the buck converter. Among its advantages are the low number of electronic switches, simple magnetics (e.g., a single inductor), and ease of control for output voltage regulation. The buck converter can also be easily configured into a multi-phase array, where multiple identical power stages are operated in parallel and out of phase for increased power capacity. Multi-phase, interleaved operation leads to a ripple current cancellation effect which enables the use of small inductance to both improve transient response and minimize input and output capacitance.

The voltage transfer function of a pulse-width modulated (PWM) regulated buck converter is:

$$V_{out}/V_{in}=D,$$

where D is the converter main switch duty cycle:

$$D=t_{ON}/T_{SW}.$$

Large input-to-output voltage difference causes the switch to be ON for only a small fraction of the switching period, with consequently low switch utilization. At very low duty cycles, the ripple cancellation provided by interleaved operation becomes much less effective.

As power demand of high-end computing equipment increases, there has been a corresponding trend toward use of higher system input voltages, e.g., 48V/54V. If a conventional buck converter is used, its duty cycle would be very low (e.g., ~2% for Vout=1 VDC). To avoid such low duty cycle operation of a traditional non-isolated buck topology, one possible solution is to use an equivalent isolated topology such as a half bridge converter for example. The voltage transfer function of a half bridge converter is:

$$V_{out}/V_{in}=n*D,$$

where D is the converter main switch duty cycle and n is the turn ratio of an isolating transformer forming part of the circuit:

$$n=N_S/N_P$$

The half bridge converter retains the buck converter simplicity and multi-phase capability while also avoiding the low duty cycle issue, but it also has undesirable inductive energy storage directly in series with the output with a negative effect on transient response. Also, the inductor resistive losses severely impacts efficiency at very high output currents.

Another possible approach is the use of composite topologies. For example, a buck converter regulating stage can be cascaded with a magnetically-coupled voltage isolation stage, equivalent to a DC transformer (DCX), to maintain higher-duty-cycle operation of the buck converter. The DC transformer may be operated at fixed duty cycle, such as 50% for example. Its voltage transfer function is equivalent to a transformer turn ratio:

$$V_{out\_DCX}/V_{in\_DCX}=n_{DCX},$$

and its current transfer function is the inverse of the turns ratio, i.e., $$I_{out}=I_{in}*(1/n_{DCX}).$$

A desirable feature of the DC transformer is its capability of converting high input voltages into high output currents but, because of the step-down nature of the preceding buck stage, the voltage at the input of the DCX stage is lower than the input voltage. To maximize the DCX current multiplication feature a (current-fed) push-pull topology may be used as its voltage transfer function is:

$$V_{out}/V_{in}=2*n*D.$$

The transformer and the control strategy of the push-pull topology are however less flexible and more difficult to design than those of a half bridge or a buck converter.

A more complicated composite topology may use a zero voltage switching (ZVS) buck-boost regulating stage to feed a resonant half bridge (or full bridge) DCX. The buck-boost voltage transfer function is:

$$V_{out}/V_{in}=D/(1-D).$$

The step-down/step-up capability of the buck-boost stage enables the DCX to operate at maximum input voltage and therefore fully exploits its current multiplication capability. The near ideal operation of the DCX stage comes at the expenses of using a sub-optimal regulation stage. The buck-boost regulator is inherently unidirectional due to the presence of a boost output diode. The lack of current sinking capability of the topology is an undesirable feature in applications where fast, symmetrical load transient response is needed. To further complicate matters, the converter dynamic response is more difficult to stabilize than a simple buck converter and multi-phase operation is not as simple as well.

Generally, it would be highly desirable to realize a DC-DC converter topology with simple output voltage regulation control and interleaved operability as in the traditional buck converter, along with high efficiency, fast load transient response, and high output current capability such as exhibited in an unregulated, high turns ratio DC transformer.

FIG. 1 illustrates the general structure of a DC-DC converter that addresses the above-discussed needs and limitations/drawbacks of alternative approaches. The DC-DC converter has cascaded stages including a regulating buck converter 10, an unregulated switched capacitor voltage doubler 12, and an unregulated voltage isolation stage, shown as DC transformer 14. As described more below, these three fundamental building blocks can be merged in a single switching structure so that each stage can take advantage of the characteristics and features of neighboring stages while still optimally performing its respective function. Shown for completeness in FIG. 1 is example regulation feedback circuitry including a pulse-width modulator 16 that responds to a feedback signal generated by a combination of function blocks 18, 20 and a mixer 22. A first function block 18, shown as H(s), provides a voltage feedback signal representative of the output voltage Vout, and the mixer 22 generates a difference signal based on the difference between the voltage feedback signal and a voltage reference. The difference signal is converted by function 20 (shown as G(s)) into a form used by the pulse-width modulator 16 to generate one or more PWM signals 24 accordingly, for controlling the operation of switches within the buck converter 10 to achieve desired regulation of the converter output voltage Vout.

FIGS. 2 and 3 show examples 12-1, 12-2 of the switched-capacitor voltage doubler 12 of FIG. 1. In these examples, a simple switched capacitor voltage doubler 12 is realized using a ladder topology and four switches configured as series stacked half bridge switching cells. The voltage doubling effect is obtained by operating the switches out of phase and at fixed 50% duty cycle. FIG. 2 shows an example with two pairs of idealized switches driven by complementary phases $\varphi_A$, $\varphi_B$, while FIG. 3 shows an example using MOSFET switches Q1-Q4 which would be driven in a similar manner.

Figure 5:
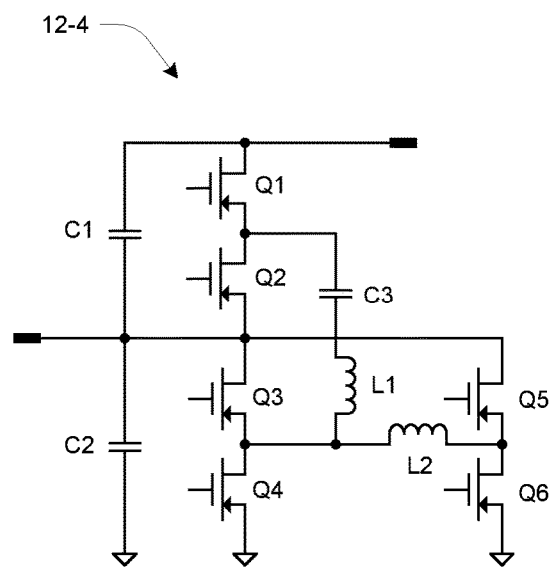

Switched capacitor voltage doublers can also take advantage of resonant and soft switching techniques. FIG. 4 illustrates a resonant zero-current-switching (ZCS) example 12-3, and FIG. 5 illustrates a ZCS/ZVS switched "tank" voltage doubler 12-4 (reflecting the resonant nature) based on a so-called Dickson topology. Generally, the converter of FIG. 1 can be realized with either a resonant or non-resonant version of the voltage doubler stage 12.

Figure 6:
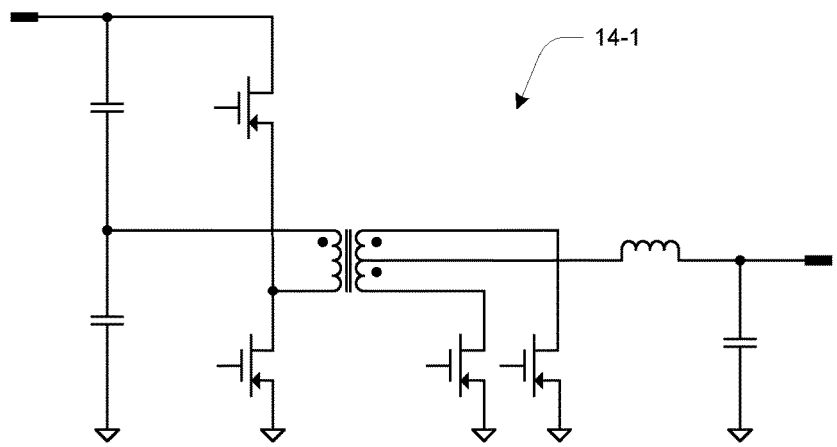
FIG. 6 is a schematic diagram of a half bridge converter realization of a DC transformer.

FIG. 6 shows an example realization of the DC transformer 14, in the form of an isolated half-bridge converter 14-1.

Figure 7:
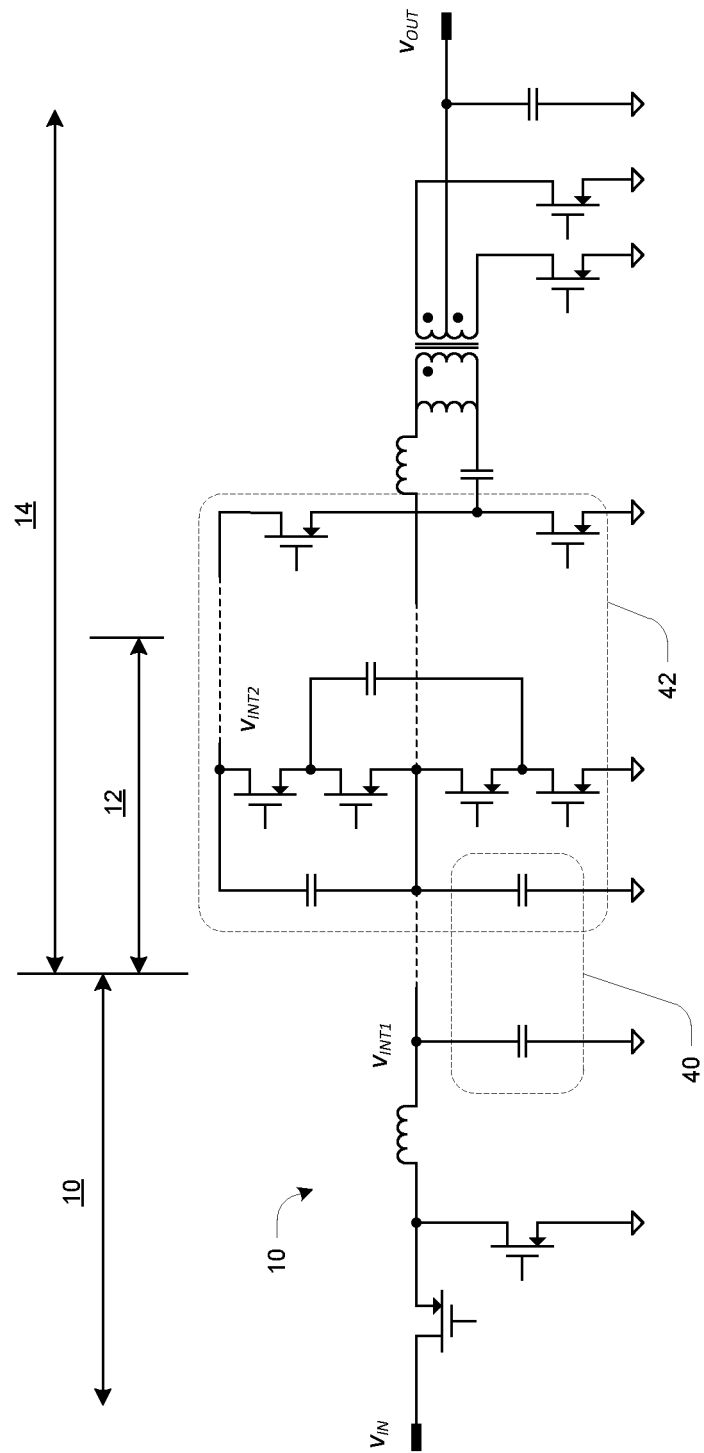
FIGS. 7-11 are schematic diagrams of alternative embodiments of a hybrid DC-DC converter.

FIG. 7 illustrates a certain commonality that enables the general scheme of FIG. 1 to be realized in a single switching structure with sharing of circuit elements across functions, as in examples given below. In FIG. 7, example circuits for the buck converter 10, voltage doubler 12, and DC transformer 14 are shown, separated by dashed lines to highlight respective boundaries. Also shown are intermediate voltages $V_{INT1}$, $V_{INT2}$, where $V_{INT1}$ is produced by the stage 10 and utilized by the stage 12, and $V_{INT2}$ is produced by the stage 12 and utilized by the stage 14. The switched capacitor voltage doubler circuit 12 has elements that are common to both the buck converter 10 and to the half-bridge DC transformer 14. Specific commonalities include capacitors 40 serving as both an input capacitor for the voltage doubler 12 as well as the output capacitor for the buck converter 10, and voltage divider circuitry 42 used by both the voltage doubler 12 and the half-bridge DC transformer 14. Thus, the three fundamental building blocks 10-14 can therefore be merged into a single switching structure in which these commonalities are exploited.

Figure 8:
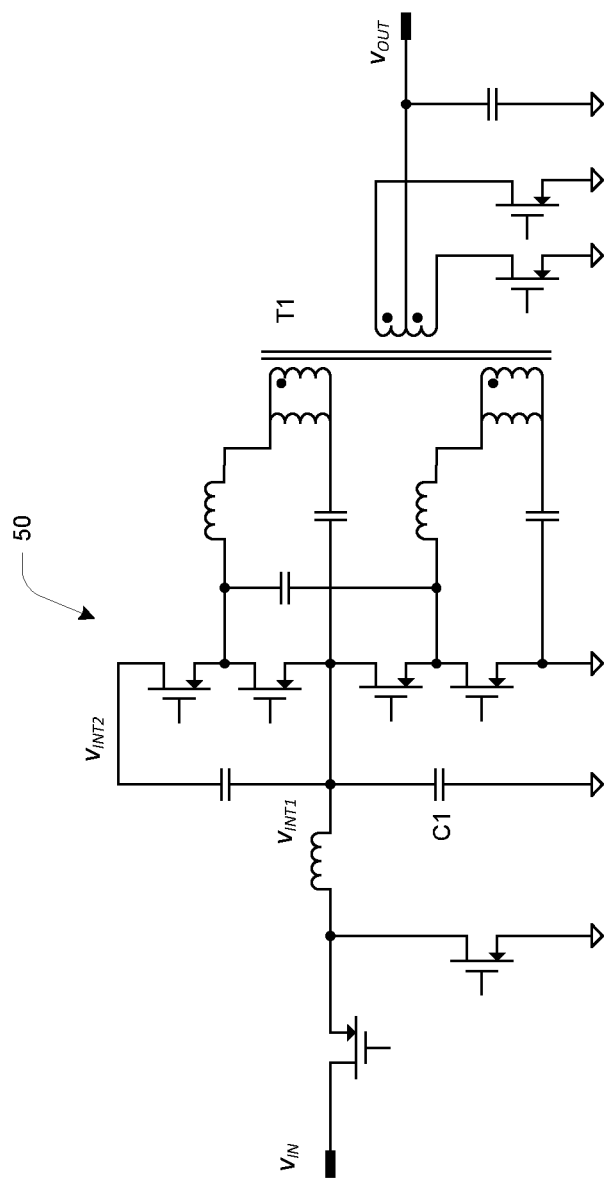

FIG. 8 shows a first example of such a merged single switching structure, in which a single capacitor C1 realizes the common capacitors 40 of FIG. 7 and a single voltage divider circuit 50 realizes the common divider circuitry 42 of FIG. 7. It can also be observed that in this hybrid, half-bridge DC-DC converter, the switched capacitor stacked half bridge switching cells 50 are operating synchronously and their mid-point sits at exactly one half of the circuit total voltage, enabling a further reduction of the basic topology. In particular, a dual primary, single secondary transformer T1 is used to reduce the number of switches and to take advantage of the lower voltage swing across the two stacked half bridge cells. The two primary windings of the transformer T1 are effectively connected in series. The multiple winding structure of this transformer naturally lends itself to a matrix configuration where either multiple magnetic paths on a single transformer core or a distributed core configuration using multiple cores can be used.

Figure 9:
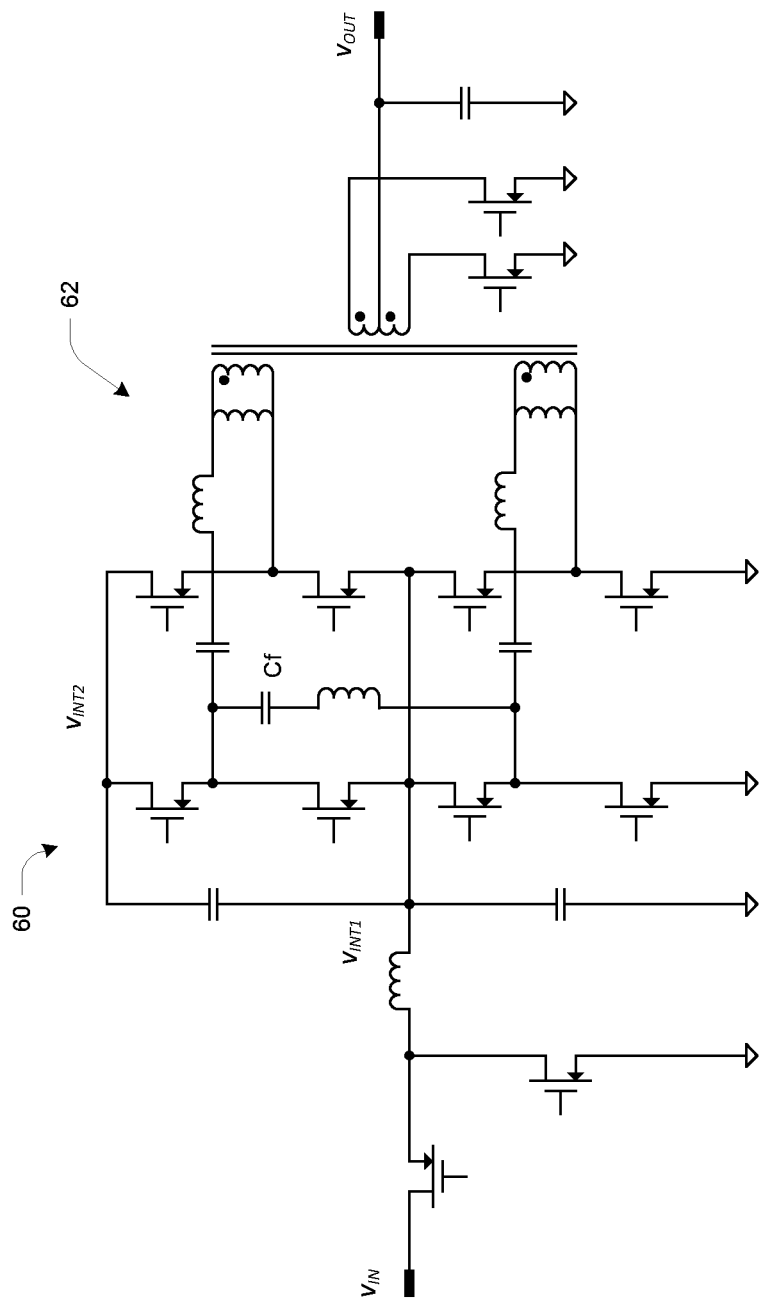

FIG. 9 illustrates an extension of the hybrid topology that merges a ZCS/ZVS voltage doubler 60 with a full bridge isolation stage 62, forming a hybrid full-bridge DC-DC converter. In this circuit, resonant ZCS operation of all switches, along with zero-voltage switching of the primary switches and soft charging of the flying capacitor Cf, can thus be obtained.

Figure 10:
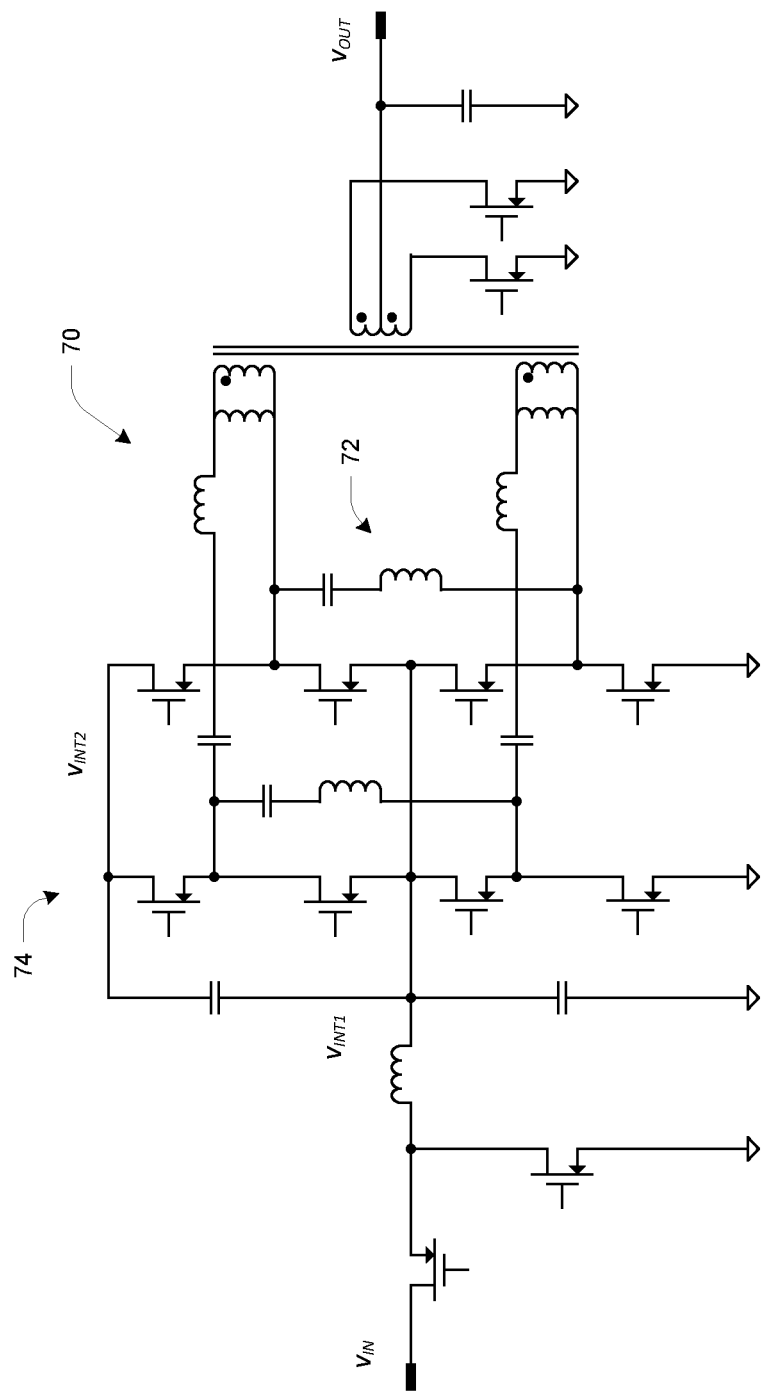

FIG. 10 illustrates a further modification in which the additional switches of the full bridge converter 70 are merged with a second switched capacitor circuit branch 72 to add power capability and the desirable feature of interleaved operation of the voltage doubler stage 74.

Figure 11:
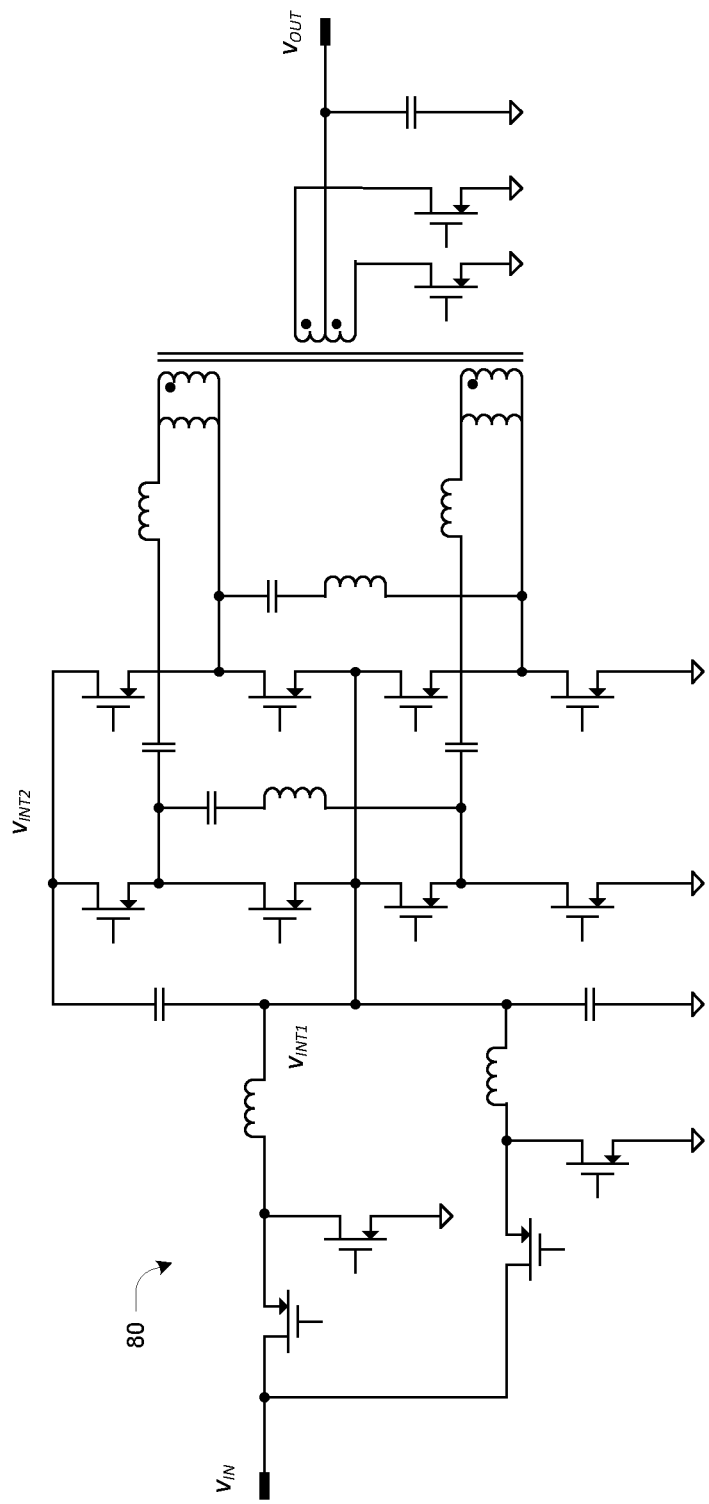

FIG. 11 shows a further example in which the buck converter input stage 80 employs interleaving for higher power throughput and improved regulation and transient response.

SUMMARY AND ALTERNATIVES

The disclosed hybrid DC-DC converter has switched inductance, switched capacitance and galvanic isolation stages (corresponding to stages 10, 12 and 14 of FIG. 1). Each stage is used in its optimal configuration. A switched inductance stage is used for voltage regulation with improved duty cycle over similar, non-isolated configurations and with a minimum number of switches. Voltage regulation is implemented on the input side of the converter for minimum current through the buck inductor for lowest resistive losses and highest efficiency. Also, the buck regulator stage performs double duty as inrush current limiter for controlled startup of the downstream switched capacitor voltage doubler. The switched capacitance stage exploits capacitive energy storage for high power density and fixed ratio voltage step up without the issues associated with buck-boost switching regulators.

Voltage doubling is achieved with simple, open loop, fixed duty cycle operation without the control issues associated with continuously regulated switched capacitor stages. Also, the minimum step up ratio enables the use of the minimum number of switches, as opposed to switched capacitor stages used for large or non-integer voltage step down ratios. The stacked switching cells configuration of the voltage doubler enables the use of MOSFETs with lowest breakdown voltage for best figure of merit and, despite the higher number of switches than a simple half bridge, is a desirable feature as it enables the use of higher performance magnetics and matrix transformers. Integration of the switched capacitance stage with the DC transformer reduces the number of switches to the minimum necessary, when compared with cascaded buck-boost plus DCX topologies, and places the current multiplication function directly on the output, with minimum series inductance, for highest efficiency and better load transient response. Switched capacitance conversion thus provides the highest achievable voltage to the DC transformer for maximum output current capability. Closing the voltage regulation loop of the hybrid converter is equivalent, from a design perspective, to the standard buck converter. Interleaving is easily implemented in the buck regulator stage and inherent in the Full Bridge version of the topology. Resonant and soft switching techniques can be implemented as well.

In alternative embodiments, the first stage 10 may be other than a buck converter. A typical application for the converter is as a voltage regulator module (e.g., for servers) powered from a 48V/54V bus. At the system level, the bus voltage may vary from 38V to 60V. To minimize resistive losses, it is desirable to distribute the highest voltage as possible to keep currents as low as possible, for a given amount of power. Also, it is imperative not to exceed the 60 Vdc limit of Safety Extra Low Voltage (SELV) to avoid incurring into more restrictive safety standards. The typical output voltage for a modern CPU or GPU may be in the 1V to 0.5V range (it is variable, depending on the operating mode of the CPU). This is a 2:1 range. Of the three basic switching regulator topologies:

1. The boost converter (step-up) has not enough headroom to regulate the output voltage in a 2:1 range if the input voltage (54V) is so close, or even equal, to the maximum desirable output voltage (60V). Nevertheless, it may work in a different application.

2. The buck-boost converter (step-up and step-down) may be used, although it may be difficult to design and may not operate well in parallel arrays. Also, the vast majority of existing controller ICs are designed for buck converters.

3. The buck converter (step-down) integrates naturally with the second stage which is equivalent to a DC transformer. In the above-mentioned application, at 38 V Vin the buck converter can regulate its output at 30V, the voltage doubler multiplies that voltage times two, 60V—still SELV—and the "merged" DCX steps it down to 1V by a fixed turn ratio, 1:60, for instance. Using the basic voltage transfer function equation of the buck, to cover the full input and output voltage ranges, the duty cycle D varies from 0.25 to about 0.8 in the "corner" cases. Using a buck is also attractive as most of the control ICs currently available can be re-used.

For the switched-capacitor stage 12, the fixed, 50% duty cycle is motivated by two reasons:

1. It provides the best switch utilization. In other words, since two switches are operated 180° out of phase, one switch is always ON for the maximum amount of time. The combined ON time of the switches is 100%. Power is transferred when switches are active and switching losses occurs during transitions. If switching time is a very small fraction of the ON time, losses are minimized.

2. In resonant configurations, the ON time of the switch can be made dependent upon current or voltage waveforms by modulating the switching frequency, for instance. By appropriately sizing circuit components, it is possible to operate the switches at either zero-current or zero-voltage switching, or a combination of the two. This mode of operation is desirable as it minimizes switching losses and enables higher switching frequencies for maximum power density.

Conceivably, a (ZVS) phase-shifted operation of the two branches of the full bridge configuration—with consequently variable duty cycle—could be used to add partial regulation capability to the otherwise unregulated switched-capacitor/DC-transformer stage(s). This may be complicated by the merged switched capacitor and galvanic isolation stage structure. A 50% fixed duty cycle is a very desirable operating condition for an unregulated stage, but in alternative embodiments the duty cycle may be other than 50% and/or be variable.

The DCX stage 14 is connected with the switched capacitor stage 12, which is possible because both stages are operated at fixed duty cycle, or "open loop" (within a closed loop regulator which includes the buck converter stage) which is a very well defined condition. Operating as many stages/switches as possible "open loop" is a desirable feature for highest efficiency because, for the reasons explained above, switches are operated in near-ideal conditions. Nonetheless, in alternative embodiments the DCX stage may be realized differently, i.e., with a duty cycle other than 50% and/or variable.

While various embodiments of the invention have been particularly shown and described, it will be understood by those skilled in the art that various changes in form and details may be made therein without departing from the scope of the invention as defined by the appended claims.

What is claimed is:

1. A hybrid DC-DC converter comprising cascaded first, second and third stages and regulation feedback circuitry coupled between an output of the DC-DC converter and a control input of the first stage for overall regulation of the DC-DC converter, the first stage being a switched inductance stage generating a first intermediate DC voltage from an input DC voltage, the second stage being an unregulated switched capacitance stage generating a second intermediate DC voltage as a predetermined multiple of the first intermediate DC voltage, and the third stage being an isolation stage providing the output of the DC-DC converter from the second intermediate DC voltage, the first stage operating in response to a pulse width modulation signal at the control input, provided by the regulation feedback circuitry, to generate the first intermediate DC voltage so as to achieve the overall regulation of the DC-DC converter.

2. The hybrid DC-DC converter of claim 1, wherein the switched inductance stage employs a regulating buck converter circuit.

3. The hybrid DC-DC converter of claim 2, wherein the regulating buck converter circuit is operated at a duty cycle in a range of 0.25 to 0.8.

4. The hybrid DC-DC converter of claim 2, wherein the regulating buck converter circuit includes a plurality of buck converters connected and operated in interleaved fashion for higher power and improved regulation and transient response.

5. The hybrid DC-DC converter of claim 1, wherein the unregulated switched capacitance stage is realized as a switched capacitor voltage doubler having a ladder topology and a set of switches configured as series stacked half bridge switching cells, the switches being operated out of phase and at fixed 50% duty cycle to obtain a voltage doubling effect.

6. The hybrid DC-DC converter of claim 1, wherein the unregulated switched capacitance stage is realized as a switched capacitor voltage doubler employing resonant and soft-switching to realize voltage doubling with zero-current switching of the switches.

7. The hybrid DC-DC converter of claim 1, wherein the unregulated switched capacitance stage is realized as a switched capacitor voltage doubler having elements that are common to both the switched inductance stage and to the isolation stage, including a common capacitor serving as both an input capacitor for the unregulated switched capacitance stage and as an output capacitor for the switched inductance stage, and including voltage divider circuitry shared by both the unregulated switched capacitance stage and the isolation stage.

8. The hybrid DC-DC converter of claim 7, wherein the switched capacitor voltage doubler includes switched capacitor stacked half bridge switching cells operating synchronously with their mid-points at exactly one half of a circuit total voltage.

9. The hybrid DC-DC converter of claim 8, including a dual primary, single secondary transformer having two primary windings connected in series.

10. The hybrid DC-DC converter of claim 9, employing a matrix configuration with either multiple magnetic paths on a single transformer core or a distributed core configuration using multiple cores.

11. The hybrid DC-DC converter of claim 1, having a hybrid full-bridge topology merging a zero-current-switching voltage doubler with a full bridge isolation stage to provide for resonant zero-current-switching operation of all switches along with zero-voltage switching of primary-side switches and soft charging of a flying capacitor.

12. The hybrid DC-DC converter of claim 1, wherein additional switches of a full bridge converter are merged with a switched capacitor circuit branch to add power capability and interleaved operation of the voltage doubler stage.

13. The hybrid DC-DC converter of claim 1, wherein the isolation stage is realized as a DC transformer.

* * * * *